United States Patent
Knoblach et al.

[11] Patent Number: 6,095,308
[45] Date of Patent: Aug. 1, 2000

[54] CLUTCH PLATE FOR MOTOR VEHICLE CLUTCHES

[75] Inventors: Richard Knoblach, Schwebenried; Alfred Schraut, Waigolshausen; Helmuth Weissenberger, Theilheim, all of Germany

[73] Assignee: Mannesmann Sachs AG, Schweinfurt, Germany

[21] Appl. No.: 09/168,952

[22] Filed: Oct. 9, 1998

[30] Foreign Application Priority Data

Oct. 11, 1997 [DE] Germany ............................ 197 45 053

[51] Int. Cl.[7] .................................................. F16D 13/64
[52] U.S. Cl. ..................................... 192/213.12; 192/214.1
[58] Field of Search ................................ 192/213, 213.1, 192/213.11, 213.12, 214.1, 214

[56] References Cited

U.S. PATENT DOCUMENTS

| | | |
|---|---|---|
| 1,952,892 | 3/1934 | Reed . |
| 2,375,116 | 5/1945 | Larkin . |
| 2,687,627 | 8/1954 | Binder ..................................... 192/214 |
| 3,091,949 | 6/1963 | Sink . |
| 3,203,205 | 8/1965 | Geibel et al. ..................... 192/214.1 X |
| 3,428,155 | 2/1969 | Binder et al. ..................... 192/214.1 X |
| 3,534,841 | 10/1970 | Schneider et al. ................. 192/213.12 |
| 3,802,541 | 4/1974 | Schneider ............................. 192/214.1 |
| 3,926,285 | 12/1975 | Preller ............................... 188/218 XL |
| 4,051,592 | 10/1977 | Briles . |
| 4,212,380 | 7/1980 | Billet ................................. 192/214.1 X |
| 4,254,855 | 3/1981 | Hildebrand et al. ................ 192/213 X |
| 4,478,326 | 10/1984 | Rotter ................................... 192/214.1 |
| 4,545,468 | 10/1985 | Caray . |
| 4,591,040 | 5/1986 | Schraut et al. ....................... 192/214.1 |
| 4,967,893 | 11/1990 | Vogele ................................. 192/107 R |

FOREIGN PATENT DOCUMENTS

| | | | |
|---|---|---|---|
| 1475346 | 12/1965 | Germany .......................... F16D 13/64 |
| 27 38 221 | 4/1978 | Germany ........................... B21K 1/52 |
| 28 17 690 | 10/1979 | Germany .......................... F16D 13/64 |
| 32 27 004 | 10/1990 | Germany .......................... F16D 13/64 |
| 33 44 954 C2 | 8/1991 | Germany .......................... F16D 13/64 |
| 44 30 262 | 2/1996 | Germany .......................... F16D 13/64 |
| 35 42 491 | 3/1996 | Germany .......................... F16D 13/64 |
| 1392788 | 3/1972 | United Kingdom ............ F16D 13/68 |
| 2 019 293 | 10/1979 | United Kingdom ............. B21J 15/02 |
| 2 151 334 | 7/1985 | United Kingdom .............. F16D 3/12 |
| 2 183 790 | 6/1987 | United Kingdom .............. F16D 3/14 |
| 2 245 336 | 1/1992 | United Kingdom .............. F16D 3/14 |
| 2 292 783 | 3/1996 | United Kingdom .............. F16D 3/14 |

*Primary Examiner*—Rodney H. Bonck
*Attorney, Agent, or Firm*—Cohen, Pontani, Lieberman & Pavane

[57] ABSTRACT

A clutch plate with a hub plate fitted onto a hub includes friction linings on a radially outer portion and covering metal plates arranged coaxially on both sides of the hub plate. The covering metal plates are connected in a rotationally fixed manner to one another via rivets. Each of the rivets includes a locking head on both sides.

4 Claims, 1 Drawing Sheet

2

CLUTCH PLATE FOR MOTOR VEHICLE CLUTCHES

BACKGROUND OF THE INVENTION

1. Field of the Invention

The invention relates to a clutch plate having an idle system and a load system with a hub plate fitted onto the hub and having friction linings on its radially outer end. The clutch plate also has covering metal plates which are arranged coaxially on both sides of said hub plate and are connected in a rotationally fixed manner to one another via rivets.

2. Description of the Related Art

A prior are clutch plate with a load damper has been disclosed, for example, in reference DE-PS 14 75 346. Covering metal plates coaxially mounted on both sides of the hub are riveted to one another and to the hub using rivets with a flat head on both sides. Riveting is very time-consuming in this prior art device so that a change is being made to the use of rivets which are provided with a flat head on only one side with a locking head on the other side. The locking head is formed by peening the material. A clutch plate which uses rivets having the locking head is disclosed, for example, in DE 33 44 954 C2.

The torque transmitted between the metal plates and the hub via the riveted joint must be transmitted by both covering metal sheets. Modern road vehicle engines often produce very high torques. Because of manufacturing tolerances, only a relatively poor riveting is achievable on the side of the rivet having the flat head, which may cause the rivet head to break off at excessively high torques. To accommodate the high torques, either thicker rivets or more rivets distributed around the circumference of the clutch plate must be used. The increase in vehicle optimization with an increase in the range of equipment at the same time is leading, however, to a reduction of the space available for individual items. All components are therefore subject to the requirement for compact construction. This means that there is often no space to provide a greater number of rivets on the circumference of the clutch plate.

If thicker rivets are used, the range of components increases, which involves more costly logistics for the manufacturer and consequently leads to a cost increase. Higher-strength materials are increasingly being used. However, because of the need for deformability, the strength of the rivet material is limited. A higher strength material of the rivet produces less material flow on the seating or flat-head side of the rivet. If the components to be riveted have an offset of the holes resulting, for example, from distortion due to hardening, no filling or only poor filling is possible for deformation of the rivets on the seating head side. If the head of the rivet is too high, the clutch plate has to be reworked after riveting so that other components can be matched to it. If the recess is insufficiently filled, the riveted joint must be undone and riveted once again. This necessary reworking increases the production costs.

A further disadvantage of the prior art is that the clutch plates are actually of the same construction for different gearboxes but often differ from one another to very small extents. In some cases, two clutch plates differ from one another in terms of their axial extent by only a few hundredths of a millimeter. Rivets of different length also have to be used for these different clutches. At a glance, the length difference is in some cases completely imperceptible. The rivets therefore have to be color-coded to prevent incorrect use. This step also increases the logistics costs.

SUMMARY OF THE INVENTION

It is an object of the present invention to provide a clutch plate which overcomes the problems of the prior art.

To solve the problems of the prior art, a clutch plate according to the present invention includes rivets with a locking head on both ends.

The riveting is carried out with cylindrical pins without any preformed head. As a result of a locking head being embossed on both sides, material flows from both sides into the rivet hole and produces a good degree of guidance from both sides. Since the torques are transmitted uniformly by both covering metal sheets and since the rivet hole now has a good degree of guidance on both sides, a rivet material of lower strength than the conventionally used rivets may be used. The material flow of the lower strength material from both sides results in a considerable improvement, particularly in the case of long clamping lengths.

In addition, stockholdings of the necessary rivet materials may be reduced because the rivets may be cut to length from a bar, as required. Therefore, the requirement of a manufacturer to stock cylindrical pins of different length does not in this case increase the logistic cost.

The locking heads are preferably arranged completely in a hole in the outer components which are to be riveted. This arrangement reduces the necessary axial space requirement to a minimum.

To improve the material flow, it is advantageous for an indentation to be provided in the center of the rivet, that is to say in the center of the rivet shank and/or rivet head. The material flow may be further improved by a projection in the stamp of the riveting tool. The indentation also prevents the projecting shank from bending out while the rivet is being upset.

An initial damper input part is preferably connected via the same rivets to the covering metal plates. The friction ring of the initial damper covers the locking head of the rivet so that a small axial physical space is required here and the clutch plate is axially of narrower construction than a conventional type.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

BRIEF DESCRIPTION OF THE DRAWINGS

In the drawings, wherein like reference characters denote similar elements throughout the several views.

DETAILED DESCRIPTION OF THE PRESENTLY PREFERRED EMBODIMENTS

Figure 1:
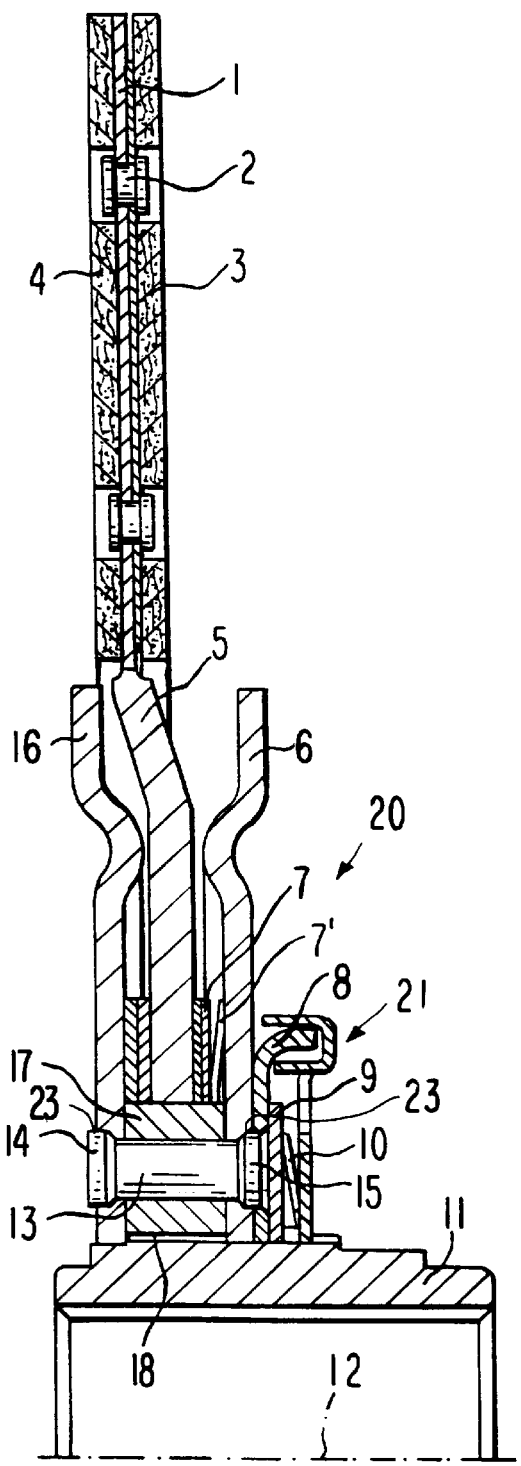
FIG. 1 is a sectional view of an upper half of a clutch plate according to an embodiment of the present invention.

Referring to FIG. 1, a clutch plate 20 according to the present invention comprises a hub plate 5 fitted onto a hub 11 which is rotatable about a rotational axis 12. Covering metal plates 6, 16 are fitted coaxially onto both sides of the hub plate 5. The covering metal plates 6, 16 are connected in a rotationally fixed manner to one another via rivets 13, which are inserted through holes 23 in the covering metal plates 6, 16. A torsion vibration damper, which is not shown in more detail here, is formed by a plurality of springs arranged on and distributed over the circumference. A compression spring 7 and a plate spring 7' form a friction-lock joint between the covering metal plate 6 and the hub plate 5.

The radially outer portion of the hub plate 5 includes a ring 1. Friction linings 3, 4 are riveted on both sides of the ring 1 by rivets 2.

As FIG. 1 shows, the clutch plate 20 includes an initial damper 21. An initial damper input part 8 is riveted via the rivets 13 to the covering metal plates 6, 16. Each of the rivets 13 have locking heads 14, 15 on both ends. The locking heads 14, 15 are located at least partially in the holes 23 in the components to be riveted to one another. In the exemplary embodiment illustrated in FIG. 1, the hub plate 5 is connected via the springs of the torsion vibration damper (not shown) and the friction device including compression spring 7 and plate spring 7' to an output part of the load damper 17, which is placed via a tooth system 18 on the hub 11. A compression spring 9 which is loaded via a plate spring 10 and is supported via a friction joint on the initial damper input part 8, covers the locking head 15 of the rivet 13. The physical axial space required in the initial damper 21 is reduced by the design of the rivet 13 with the locking head in comparison with conventional clutch plates.

The absence of the previously projecting rivet head at the same time creates the space for the friction surface and the initial damper friction device. The capability to meter exactly the material volume to be pressed makes it possible, in addition, to rivet the initial damper input part 8 without any rivet projection, with a constant degree of filling.

The riveting tool used for connecting the rivets 13, which is not illustrated here, is designed such that the projection of the cylindrical pin used for the rivet 13 can be set as required.

Figure 2:
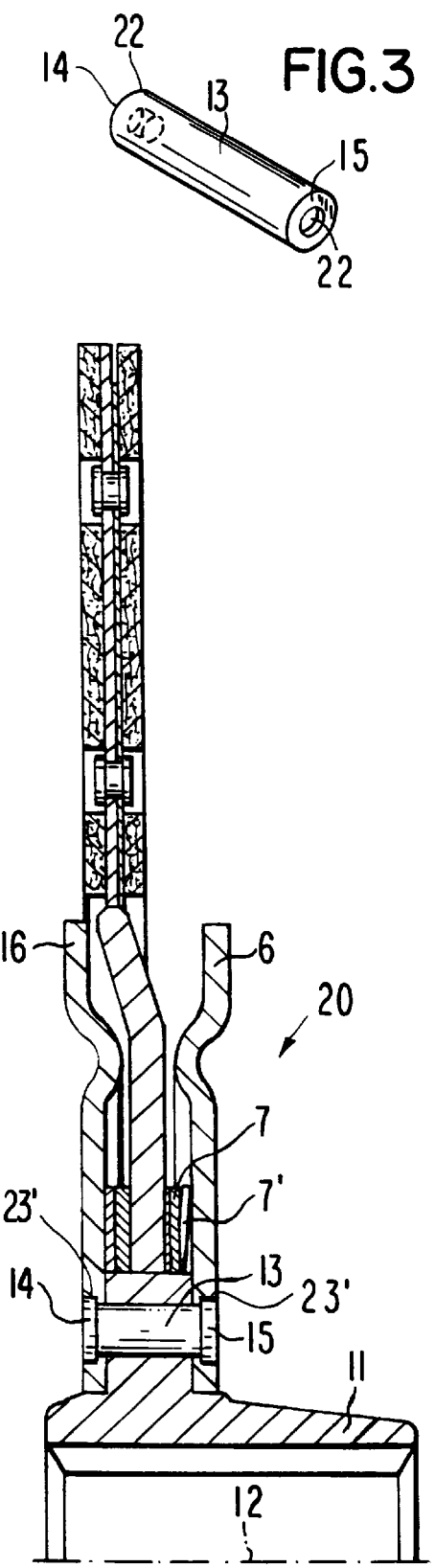
FIG. 2 is a sectional view of an upper half of a clutch plate according to another embodiment of the present invention.

Referring to FIG. 2, a clutch plate 20' using countersunk riveting may be used which always results in the ideal head shape. In this embodiment, the locking heads 14, 15 are located completely in holes 23' in the covering metal plates 6, 16. The countersink is thus well-filled and the permissible projection is not exceeded. The locking head 14 provides the tolerance compensation on the side opposite the initial damper 21 (see FIG. 1), where greater tolerances are permissible in terms of height and diameter.

Figure 3:
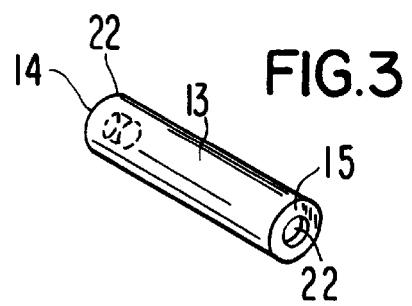
FIG. 3 is a perspective view of a rivet used in the clutch plate of FIGS. 1 and 2.

Referring to FIG. 3, an indentation 22 may be arranged at the center of each rivet head 14, 15 to improve material flow properties during peening.

The invention is not limited by the embodiments described above which are presented as examples only but can be modified in various ways within the scope of protection defined by the appended patent claims.

We claim:

1. A clutch plate, comprising:

a hub rotatable about an axis of rotation;

a hub plate mounted on said hub and rotatable relative to said hub about said axis of rotation;

friction linings arranged on a radial outer portion of said hub plate first and second cover plates arranged coaxially on both sides of said hub plate frictionally connected to said hub plate; and a rivet inserted in through-holes of said first and second cover plates and said hub for fixedly connecting said first and second cover plates to said hub, wherein said rivet comprises a cylindrical pin having first and second ends with a locking head formed during riveting at each of said first and second ends for fixedly connecting said first and second cover plates to said hub, wherein said locking heads are arranged completely in the through-holes in said first and second cover plates.

2. The clutch plate of claim 1, wherein said rivet comprises an indentation at said first and second ends for improving material flow properties of said rivet at said first and second ends.

3. The clutch plate of claim 1, further comprising an initial damper having an initial damper input part connected via said rivets to one of said first and second covering metal plates and wherein said hub comprises an output part of said load damper and said first and second cover plates are fixed with respect to rotation relative to said output part of said load damper.

4. The friction clutch of claim 3, wherein said initial damper further comprises a friction ring covering said locking heads of said rivets at said one of said first and second metal plates.

* * * * *